United States Patent Office 3,256,309
Patented June 14, 1966

3,256,309
PREPARATION OF CYANFORMIMIDE ESTERS
Wilhelm Gruber, Darmstadt, Germany, assignor to Röhm & Haas G.m.b.H., Darmstadt, Germany
No Drawing. Filed Feb. 28, 1963, Ser. No. 261,820
Claims priority, application Germany, Mar. 3, 1962, R 32,189
3 Claims. (Cl. 260—453)

This invention relates to the preparation of cyan-formimide esters.

It is known in the art that alcohols react with cyanogen in the presence of alkaline catalysts, and such a reaction is generally performed by passing gaseous cyanogen into an alcohol having dissolved therein an alkaline compound (such as an alkali alcoholate or an alkali cyanide) which catalytically influences the reaction. In such a reaction, mixtures of cyanformimide esters and oxalic acid di-imide esters are always obtained, i.e. mixtures of products formed by reaction of one mol of alcohol per mol of cyanogen (cyan-formimide esters) and of two mols of alcohol per mol of cyanogen (oxalic acid di-imide esters):

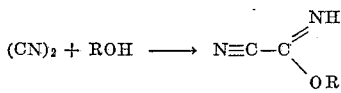

and

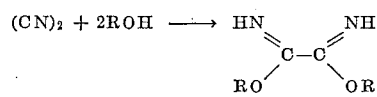

The term R refers to the hydrocarbyl portion of the alcohols below listed. Although the prior art teaches means by which either the mono-addition product or the di-addition product can be obtained in predominant quantities, no process has previously been known which produces with strong selectivity substantially only the mono-addition product, i.e. the cyanformimide ester of the alcohol employed. Such cyanformimide esters have insecticidal and insect-repelling properties, and can be used as pesticides either alone or in admixture with hydrogen cyanide and/or cyanformic acid esters. Cyanformimide esters are also useful as intermediates in the synthesis of cyanformic acid esters, for example according to the process described and claimed in copending application Serial No. 261,884 filed on even date herewith.

According to the present invention, cyanformimide esters are obtained without simultaneous formation of corresponding di-addition products (oxalic acid di-imide esters) when the reaction between cyanogen and an alcohol takes place in the presence of small amounts, advantageously between about 0.5 and about 10 percent by weight of the alcohol reacted, of a tertiary alkyl amine having from 1 to 6 carbon atoms in each of the alkyl groups. As exemplary of materials of this type, trimethyl amine, tributyl amine, trihexyl amine, and mixed amines such as diethylbutyl amine can be mentioned.

The formation of the ester product according to the invention preferably takes place at low temperatures, for example from about 0° C. to about 20° C. Nevertheless, and particularly for the reaction of higher boiling alcohols, higher temperatures of, for example, up to or over about 50° C. are suitably employed. The reaction is conveniently effected by passing cyanogen into a mixture of the amine catalyst and a primary monohydric saturated or unsaturated aliphatic or aromatic alcohol to be esterified. Alternatively, and particularly for the cyanogenization of higher alcohols which may be solids at ordinary temperatures, or when gaseous amines such as trimethyl amine are employed as catalysts, the reaction advantageously also can take place in a solvent medium inert to the reaction, for example in ethers, esters, or hydrocarbon solvents. The alcohols reacted, as mentioned just above, are those whose cyanformic acid esters can be formed by the conventional prior art esterification reactions earlier described, and include ethylenically and acetylenically unsaturated materials such as allyl and propargyl alcohols, as well as saturated monohydric alcohols, and aromatic materials having a primary alcohol group, such as benzyl alcohol. The alcohols may be substituted with groups non-reactive with cyanogen. The primary monohydric aliphatic alcoholic materials also include partially esterified polyhydric materials such as glycolmonoacetate and glycolmonomethacrylate. Advantageously at least an equimolar amount of alcohol is contacted with cyanogen in the reaction.

After reaction, the cyanformimide esters formed can conveniently be separated in pure form from the reaction mixture by conventional techniques such as crystallization or distillation, suitably after prior neutralization of the basic catalyst.

A better understanding of the invention and of its many advantages can be had by referring to the following specific examples given by way of illustration.

Example 1

Cyanformimide ethyl ester was prepared by passing 44.4 gm. of cyanogen, with stirring over a three hour period and at temperatures of from 0° to 5° C., into 50 gm. of ethyl alcohol to which had been added 2 gm. of triethyl amine. Thereafter, 1.2 gm. of acetic acid were added to neutralize the amine and the resulting mixture was subsequently fractionated in vacuum. The yield of reaction product was 94% of theory. The product had a boiling point of 46° C. at 25 mm./Hg and a refractive index $n_D^{20}$ of 1.4198.

Example 2a

Cyanformimide allyl ester was prepared by passing 28.2 gm. of cyanogen over a two hour period with stirring and at about 5° C. into 30 gm. of allyl alcohol containing 1.5 gm. of tributyl amine. On distillation, 51.8 gm. of cyanformimide allyl ester (86.9% of theory) were obtained. The product had a boiling point of 60° C. at 25 mm./Hg and an $n_D^{20}$ of 1.4450.

Example 2b

Cyanformimide allyl ester was prepared under the conditions of Example 2a by passing 30.2 gm. of cyanogen into a mixture of 50 gm. of allyl alcohol and 2.5 gm. of tributyl amine. The reaction mixture was subsequently neutralized with 1.55 gm. of acetic acid and then distilled in vacuum. The yield was 61.65 gm. of reaction product, or 96.5% of theory.

Example 3

Cyanformimide propyl ester was prepared by reacting 120 gm. of n-propanol with 61.2 gm. of cyanogen under the conditions of Example 1 and in the presence of 6 gm. of tributyl amine. After neutralization with acetic acid, the resulting mixture was distilled. The yield of final product was 107.7 gms., or 81.7% of theory. The product had a boiling point of 54.5° C. at 20 mm./Hg and an $n_D^{20}$ of 1.4239.

Example 4

Cyanformimide benzyl ester was prepared by reacting cyanogen and benzyl alcohol in the presence of 5% of triethyl amine using the procedures of the earlier examples. After the usual recovery steps, a yield (81% of theory) of cyanformimide benzyl ester was obtained. The product had a boiling point of 108° C. at 5 mm./Hg and an $n_D^{20}$ of 1.5290.

Example 5

Cyanformimide 2-nitrobutyl ester was prepared by passing 52 gm. of cyanogen over a two hour period into a solution of 119 gm. of 2-nitrobutanol-1 and 6 gm. of trihexylamine in 200 ml. of ether at 0° C. The reaction mixture was stirred at this temperature for an additional two hours. After neutralization with acetic acid, the ether was removed in vacuum. The residue was crystallized by refrigeration. After recrystallization from acetone, cyanformimide 2-nitrobutyl ester was obtained in the form of white crystals. The yield, 127 gm., was 74.5% of theory, and the crystals had a melting point of 50–55° C. On analysis, N found: 24.85%. N calc.: 24.6%.

Example 6

Cyanformimide β-chloroethyl ester was prepared by passing 52 gm. of cyanogen into a solution of 80.5 gm. of β-chloroethyl alcohol and 4 gm. of diethylbutyl amine in 100 ml. of ethylacetate over a period of three hours and at a temperature between 5° C. and 10° C. After neutralization of the tertiary amine with propionic acid, the cyanformimide β-chloroethyl ester was isolated from the reaction mixture by distillation. The yield was 118 gm., or 89% of theory. The boiling point of the product was 55–65° C. On analysis, N found: 20.3%. N calc.: 21.1%.

Although specific embodiments have been shown and described herein, it is to be understood that they are illustrative, and are not to be construed as limiting on the scope and spirit of the invention.

What is claimed is:

1. In the method for preparing cyanformimide esters by reaction of a primary monohydric alcohol with cyanogen in the presence of an alkaline catalyst, the improvement of reacting said alcohol and cyanogen at a temperature between about 0° and about 50° C. in the presence of a trialkyl amine in which the alkyl groups each have from 1 to 6 carbon atoms, whereby the formation of oxalic acid di-imide esters is avoided.

2. A method as in claim 1 wherein said alcohol and cyanogen are reacted at a temperature between about 0° C. and about 20 °C.

3. A method as in claim 1 wherein at least an equimolar amount of alcohol is contacted with cyanogen for reaction.

References Cited by the Examiner

UNITED STATES PATENTS 2,333,493   11/43   Rigby.

OTHER REFERENCES

Hahn et al.: Deutsche Chemische Gesellschaft Berichte, 1935, vol. 68, pp. 1974–1986.

Woodburn et al.: Journal of Organic Chemistry, 1959, vol. 24, pp. 210–214.

CHARLES B. PARKER, *Primary Examiner.*